United States Patent
Bearak

(10) Patent No.: US 6,696,966 B2
(45) Date of Patent: Feb. 24, 2004

(54) AUTOMATIC SALT LEVEL MONITOR FOR A WATER SOFTENING DEVICE

(75) Inventor: Justin Blair Bearak, Highland Park, IL (US)

(73) Assignee: USF Consumer & Commercial WaterGroup, Inc., Northbrook, IL (US)

( * ) Notice: Subject to any disclaimer, the term of this patent is extended or adjusted under 35 U.S.C. 154(b) by 0 days.

(21) Appl. No.: 09/835,981

(22) Filed: Apr. 16, 2001

(65) Prior Publication Data

US 2002/0149489 A1 Oct. 17, 2002

(51) Int. Cl.[7] ............................................. G08B 21/00
(52) U.S. Cl. ...................... 340/618; 340/620; 340/612; 340/617; 340/619; 73/61.48; 73/293; 200/61.2
(58) Field of Search ................................. 340/618, 620, 340/623, 612, 617, 619, 624; 210/190; 200/61.2; 73/290 R, 61.48, 61.43, 293

(56) References Cited

U.S. PATENT DOCUMENTS

| | | | | |
|---|---|---|---|---|
| 3,947,692 A | * | 3/1976 | Payne | ........................ 250/577 |
| 4,917,794 A | * | 4/1990 | Fettes et al. | ............... 210/96.1 |
| 5,239,285 A | * | 8/1993 | Rak | ........................... 340/623 |
| 5,585,786 A | * | 12/1996 | Clark et al. | ................. 340/623 |
| 5,699,272 A | | 12/1997 | Zabinski | |
| 5,751,598 A | | 5/1998 | Zabinski et al. | |
| 6,238,567 B1 | * | 5/2001 | Van de Moortele | ......... 210/670 |

FOREIGN PATENT DOCUMENTS

| | | |
|---|---|---|
| DE | 29 11 366 A | 10/1980 |
| EP | 1147736 | 10/2001 |
| GB | 1 160 928 A | 8/1969 |
| GB | 1 288 729 A | 9/1972 |

* cited by examiner

*Primary Examiner*—Julie Lieu
(74) *Attorney, Agent, or Firm*—Greer, Burns & Crain, Ltd.

(57) ABSTRACT

The present invention provides an automatic monitor for use in a tank with a water soluble softening agent. The monitor includes a signal emitter that produces a signal capable of being detected by an array of signal-detecting sensors. The sensors are displaced generally vertically in the brine tank from the minimum depth of the softening agent to the maximum depth of the softening agent. An output is produced in response to said signal. The monitor also includes an electronic device for receiving and interpreting the output and determining if a low softening agent condition is present as the supply of the softening agent is depleted. An indicator warns when a low softening agent condition is present. Preferably, the sensors are linearly spaced within the tank.

23 Claims, 8 Drawing Sheets

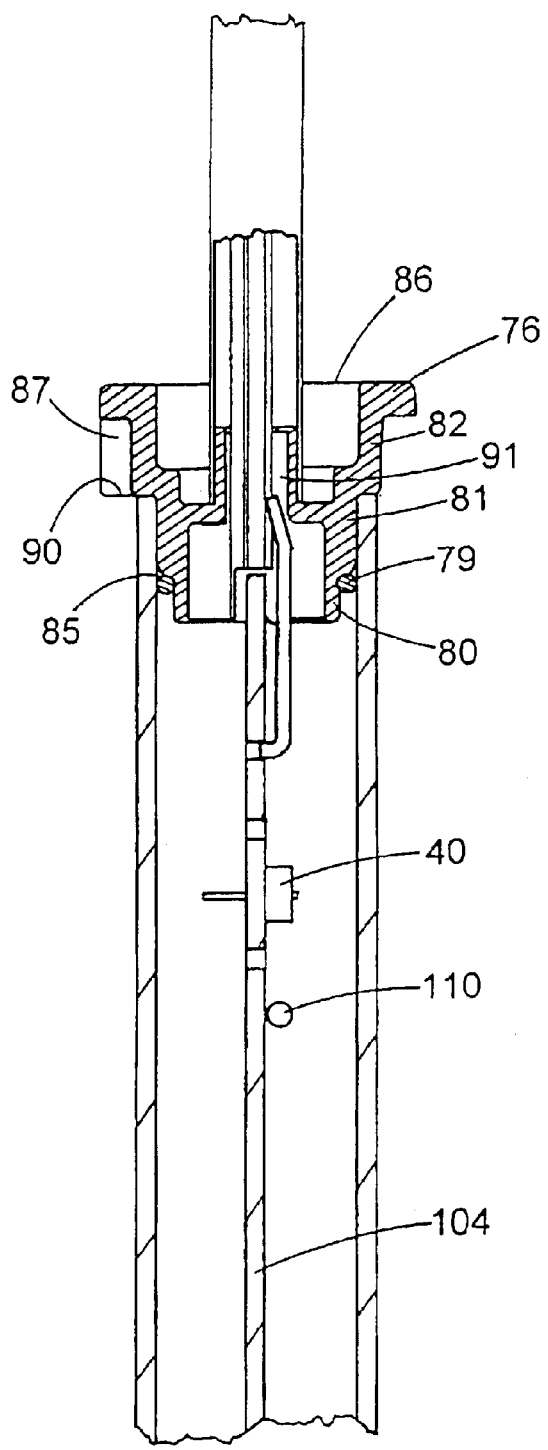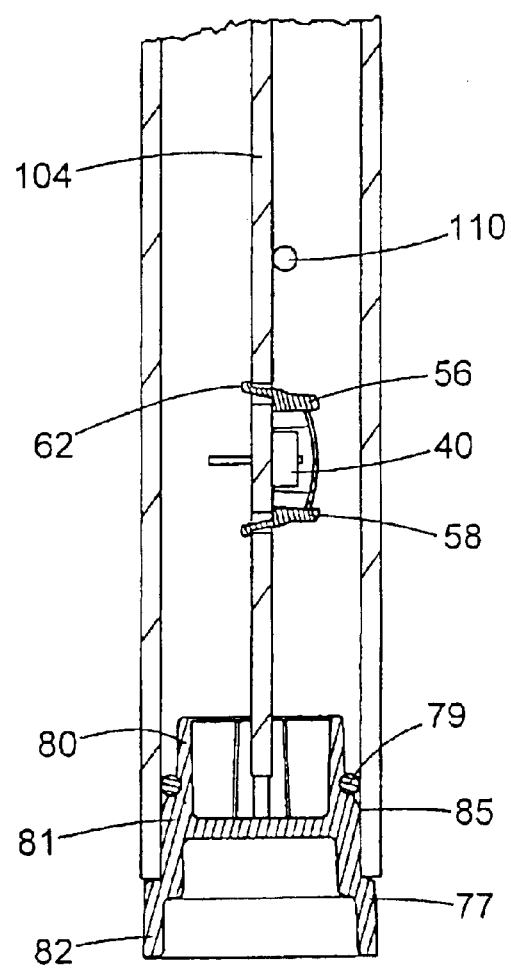
Fig.4
Fig.5

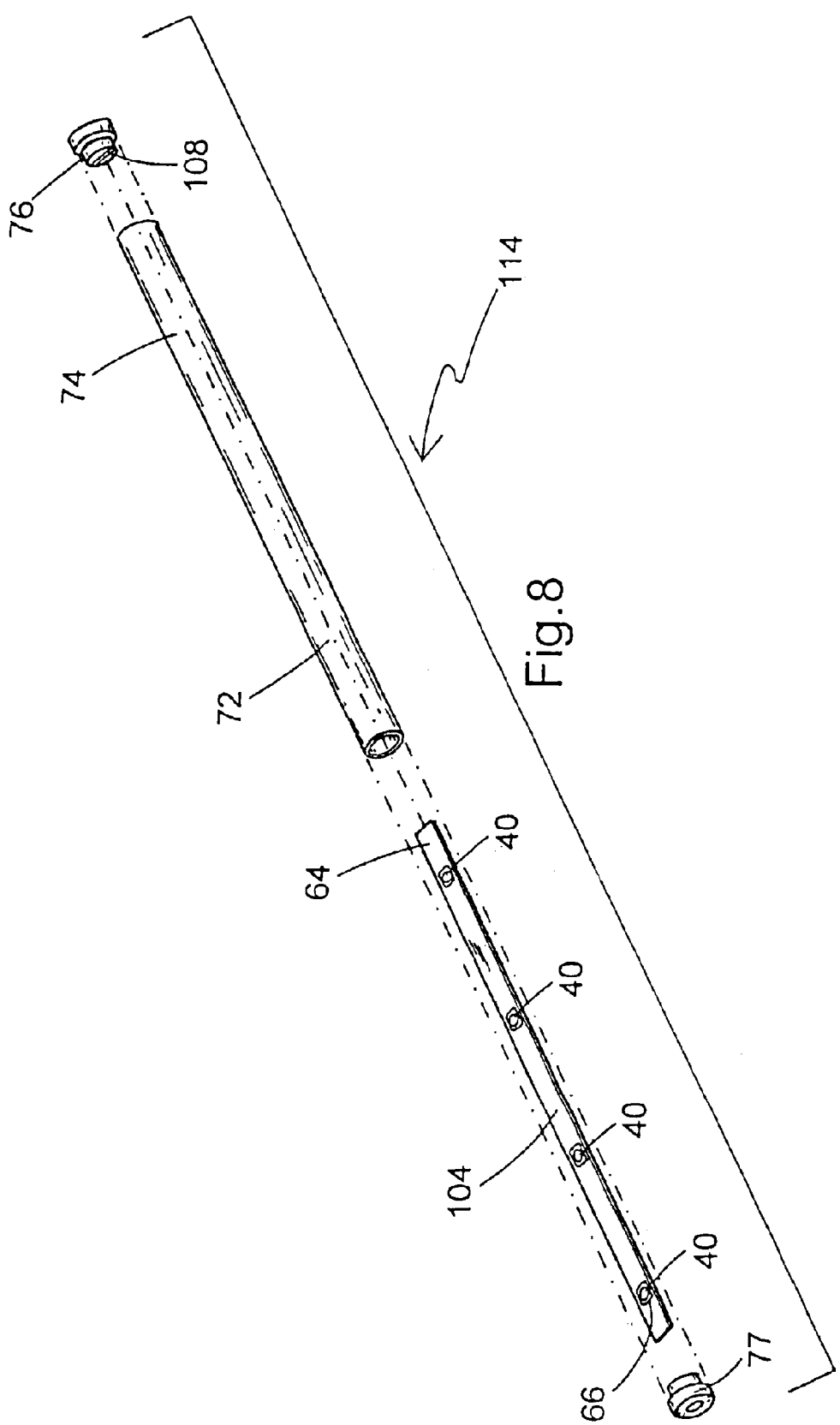

AUTOMATIC SALT LEVEL MONITOR FOR A WATER SOFTENING DEVICE

BACKGROUND

This invention relates to a monitor for the level of salt in a water softener. More specifically, it relates to an automatic monitor that detects and indicates when the salt level in the brine tank is insufficient to completely regenerate the resin during subsequent regenerations.

While treating hard water, the ion exchange resin in a water softener absorbs calcium and magnesium ions from the water and replaces them with sodium ions. The resin becomes ineffective when the amount of available sodium is depleted and the resin is saturated with calcium and magnesium, and must be periodically regenerated. Water treatment is then suspended while the resin is regenerated in a multi-step process to flush the calcium and magnesium ions from the resin and restore the sodium level. The resin is first backwashed, by reversing the flow of the incoming water, to remove sediment. Next, the resin bed is contacted with a brine solution, whereby the resin takes sodium ions from the high concentration solution and displaces the calcium and magnesium ions into the brine. When an optimum amount of ion exchange has taken place, the brine solution and the unwanted hard water ions in it are discharged from the resin bed. After being rinsed to remove residual brine, the restored resin bed is then returned to service treating hard water.

Preparation of the brine solution takes place in a brine tank that is kept separate from the resin tank. The brine tank, which contains a supply of salt, is filled with water to form a saturated salt solution. The salt supply must be replaced periodically due to depletion of repeated regenerations. If the salt level is too low to make a brine solution of a given strength, there will be an insufficient sodium level to drive the exchange of calcium and magnesium ions and the resin will not effectively treat the hard water when it is placed back in service.

Generally, there is no automatic warning when the amount of salt is insufficient to restore the resin bed to an optimum ion exchange capacity. It has been left to the user to manually determine the salt level, usually by visually inspecting and estimating the salt level in the tank. Any manual determination of salt level is inconvenient for the user, who must frequently look into the brine tank. An inexperienced user may not know how much salt is required per regeneration, and create more work by adding salt too frequently or having hard water when salt is not added frequently enough.

To avoid having to make frequent visual inspections, users often prefer a softener unit with large salt capacity. Large units are more convenient, but also take up large amounts of space that may be prohibitive in small living spaces such as townhomes or condominiums. For areas where the softener unit may be visible, the exterior of some models is styled with an attractive cabinet-like finish. However, since this type of exterior finish is more expensive and, because they are generally used where space is a premium, the size of such units is usually small, requiring the user to frequently check the salt level.

The prior art provides an indicator stick, similar to a ruler, with reference marks to aid in judging the depth of salt present. Visual inspection is inaccurate even with reference marks, particularly when salt bridges are formed. While the brine is being made, the salt continuously dissolves and redeposits due to chemical equilibrium reactions. Salt bridges form when pieces of salt "grow" together from salt deposition, and can make the volume of salt appear to be greater than is actually present. The salt under the bridge may be substantially dissolved, leaving only a small amount of salt in the tank even when a visual inspection from the top of the tank looks as if the salt bed has ample depth to complete additional regenerations.

Previous attempts to incorporate electronic monitors into water softeners have not proven satisfactory. Monitors were designed that utilized a weighted sensor on top of the salt to determine the salt level. However, if the operator forgot to remove the sensor when salt was added, the sensor would become buried, and falsely signal that the salt level was low.

A low salt level sensor utilizing a float is taught in U.S. Pat. No. 5,239,285, which is herein incorporated by reference. The salt level in this invention was determined by displacement of water. A predetermined amount of water was added to the brine tank, and if there was insufficient displacement of the water to push a float to a given level, the low-salt alarm was activated. However, this method requires that a portion of the apparatus be submerged in the brine, an environment that is corrosive and deposits salt on the equipment.

It is therefore an object of this invention to provide an improved monitor for the salt level in a water treatment device.

It is another object of this invention to provide an improved monitor for salt level that automatically checks the salt level without intervention from the user.

It is still another object of this invention to provide an improved salt monitor that provides an indication to the user when the amount of salt is too low to provide effective regeneration.

It is yet another object of this invention to provide an improved salt monitor that accurately indicates when salt should be added, even when salt bridges are formed.

SUMMARY OF THE INVENTION

The present invention provides an automatic monitor for use with a water conditioning apparatus. The improved monitor periodically checks the level of salt in the brine tank without intervention by an operator and provides a warning if the salt level is too low to effectively regenerate the ion exchange resin during the next regeneration cycle.

More specifically, the present invention provides an automatic monitor for use in a tank with a water soluble softening agent. The monitor includes a signal emitter that produces a signal capable of being detected by an array of signal-detecting sensors. The sensors are displaced generally vertically in the brine tank from the minimum depth of the softening agent to the maximum depth of the softening agent. The sensor produces an output in response to the signal.

The monitor also includes an electronic device for receiving and interpreting the output and determining if a low softening agent condition is present as the supply of the softening agent is depleted. An indicator warns when a low softening agent condition is present. Preferably, the sensors are linearly spaced within the tank.

The monitor of the present invention is advantageous to the user because it continuously monitors the salt level in the brine tank and provides a warning indicator when the salt level has dropped too low to successfully complete another regeneration. Continuous real-time monitoring of the salt level can also be achieved with the present monitor, if the electronics device that interprets the sensor output is programmed to do so. There is no need for the user to open up the softener cover on the brine tank to inspect the salt level. Even inexperienced users know from the indicator exactly when to add salt without having to guess if the amount of salt left is sufficient for the next regeneration.

The electronics of the present monitor are also optionally programmable to anticipate the calculated salt level, so that problems can be detected if the measured level differs significantly from the calculated level. Such differences can be indicators of salt bridges, faulty sensors or emitters, loss of eduction or overfilling of the brine tank. These features significantly improve both the convenience to the user as well as the accuracy of the reported salt level. Using a visual inspection of the brine tank, the user often has no way to tell that problems, such as salt bridges, exist below the surface of the salt bed. The present electronic monitoring system removes the inconvenience of repeated checking and the guesswork from maintaining an appropriate salt level in the water softener.

BRIEF DESCRIPTION OF THE DRAWINGS

FIG. 4 is a top plan view of the top cap attached to an interior surface;

FIG. 5 is a perspective view of the sensor and shroud mounted on an elongated member and inserted into the top cap;

FIG. 8 is an exploded perspective view of the sensors mounted on an elongated member, showing how the elongated member fits inside the protective device with the top and bottom caps;

DETAILED DESCRIPTION OF THE INVENTION

Figure 1:
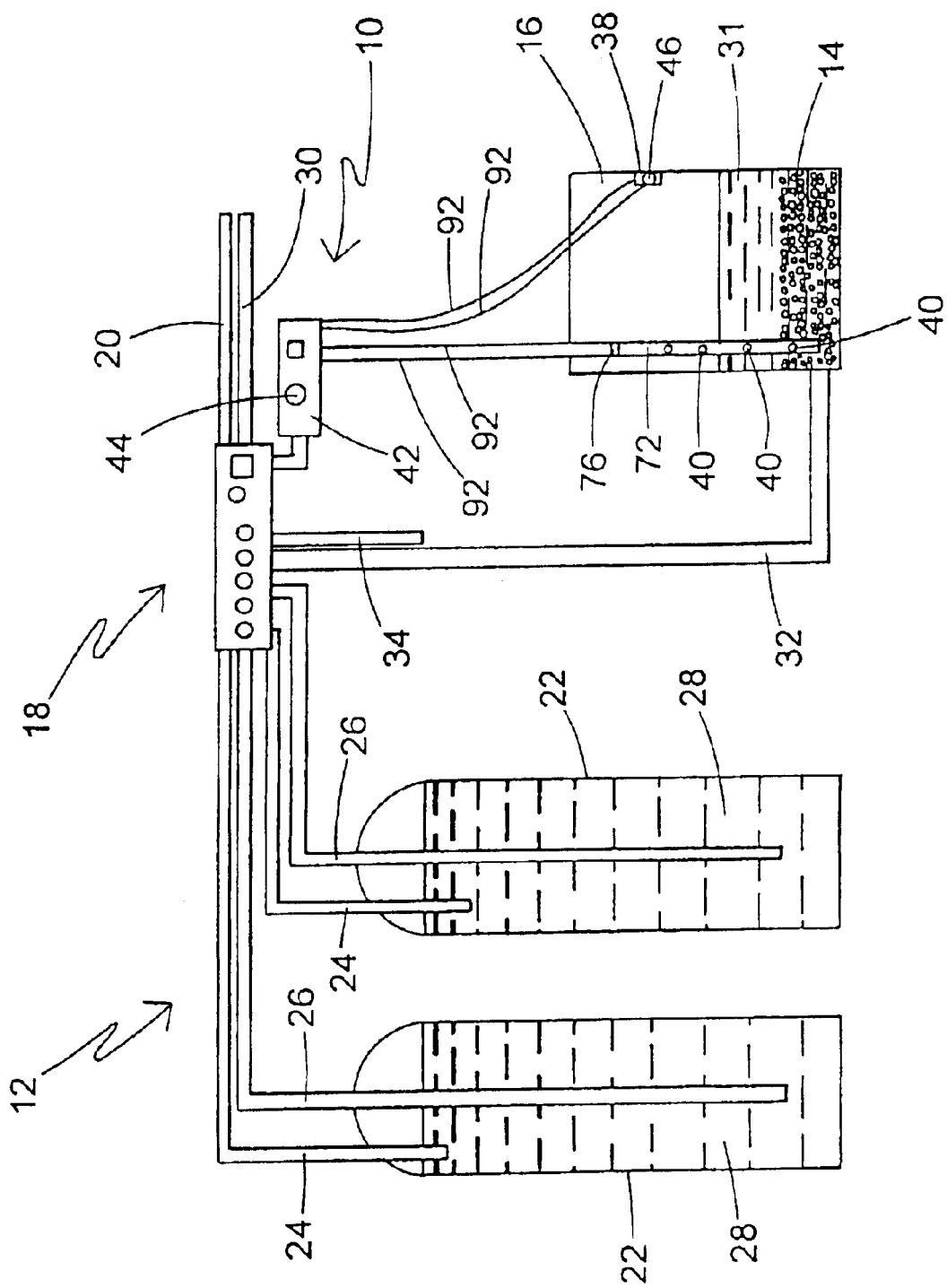
FIG. 1 is a stylized diagram of a water softening system constructed in accordance with the principles of the present invention.
Figure 2:
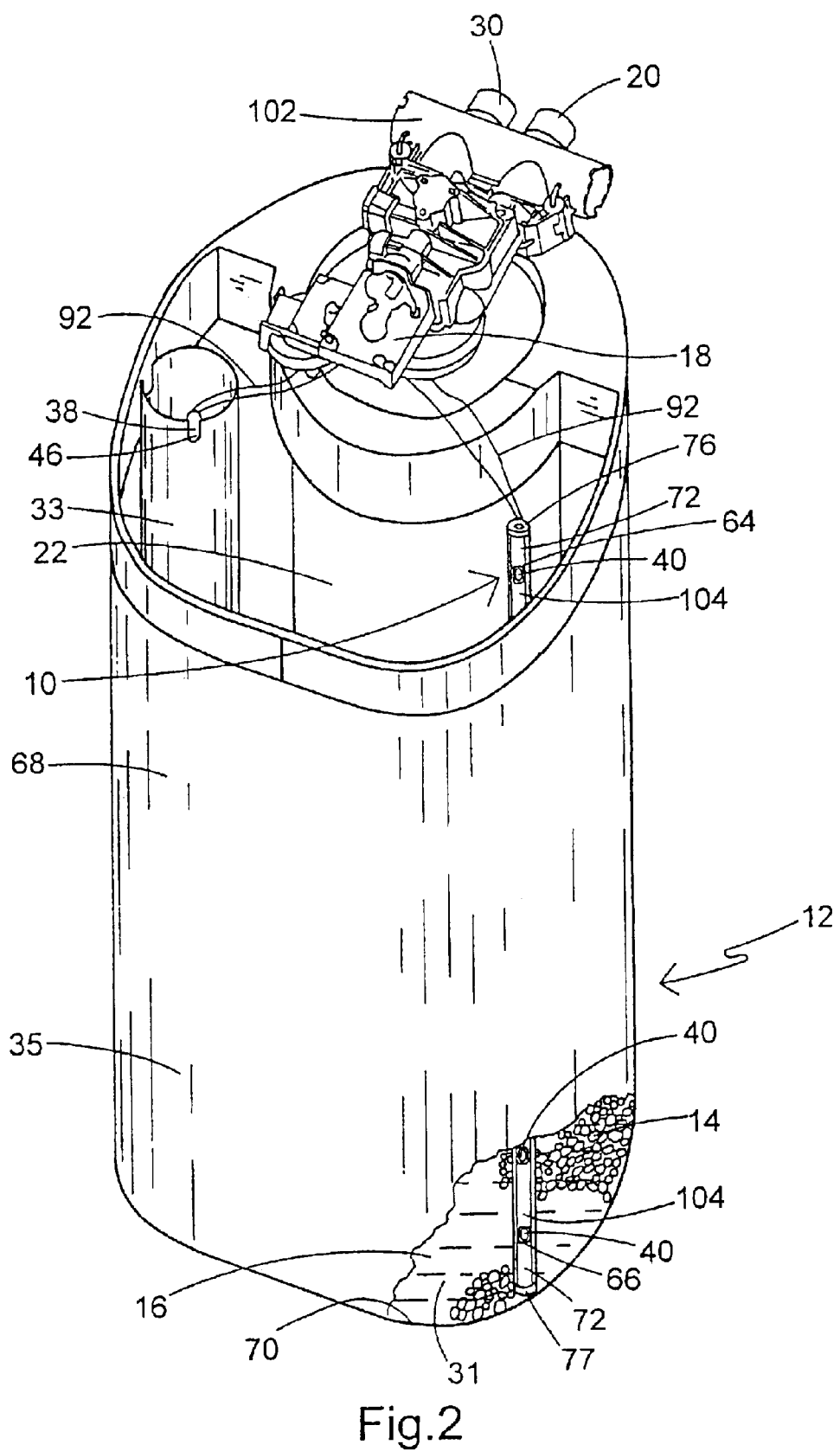
FIG. 2 perspective view of a water softener with the present automatic salt level monitor and with a portion of the cabinet removed to show the sensors in the salt bed.

Referring now to FIGS. 1 and 2, the present softening agent monitor, generally designated 10, is used in a water softener, generally designated 12, to determine the amount of softening agent 14 in a chamber 16. The monitor 10 is suitable for use in most water softeners 12 that use softening agents 14 in solid form. Sodium salts, such as sodium chloride in pellets, a solid block or in a granular form, are the most common softening agents 14, but use of any solid softening agent is contemplated for use with this invention. Use of high purity salts is recommended to lengthen the time between salt additions and to reduce the amount of impurities that accumulate in the bottom of the water softener 12, but does not directly effect the operation of the monitor 10 described herein.

Referring to FIG. 1, during softening, a unit controller 18 operates valves to allow fresh, hard water from a supply 20 to flow into a resin tank 22 through an inlet 24, treated or soft water exits through an outlet 26. Between the inlet 24 and the outlet 26, the hard water contacts a sodium rich ion-exchange resin 28, where calcium and magnesium ions present in the hard water are held by the resin 28 and sodium ions are released into the soft water. Softened water is discharged from the softener through a treated water outlet 30.

When the resin 28 is saturated with hard water ions and the sodium ions are depleted, the resin is regenerated. During regeneration, a brine solution 31 is withdrawn from the salt chamber 16 through a brine valve and enters the resin tank 22 through the inlet 24. Brine well 33 keeps said particles of softening agent 14 from clogging the brine valve, while allowing the brine solution to flow freely to the valve. Hard water ions are released from the resin 28 into the brine solution 32 as sodium ions from the brine are absorbed by the resin. Spent brine 32 leaves the resin tank 22 through the outlet 26 and is removed from the unit through a waste discharge 34.

At the end of the regeneration cycle, water is added to the salt chamber 16 so that the softening agent 14 dissolves, making a saturated brine solution 32 to be used during the subsequent regeneration. The brine solution 32 is kept separate from the water supplies 20, 30 and resin 28 while softening is taking place so that the brine 52 does not contaminate the fresh water supplies and because ion exchange between the resin 28 and the hard water would not occur efficiently in the presence of brine. Only during the regeneration cycle is the brine solution 32 brought into contact with the ion exchange resin 28.

Figure 10:
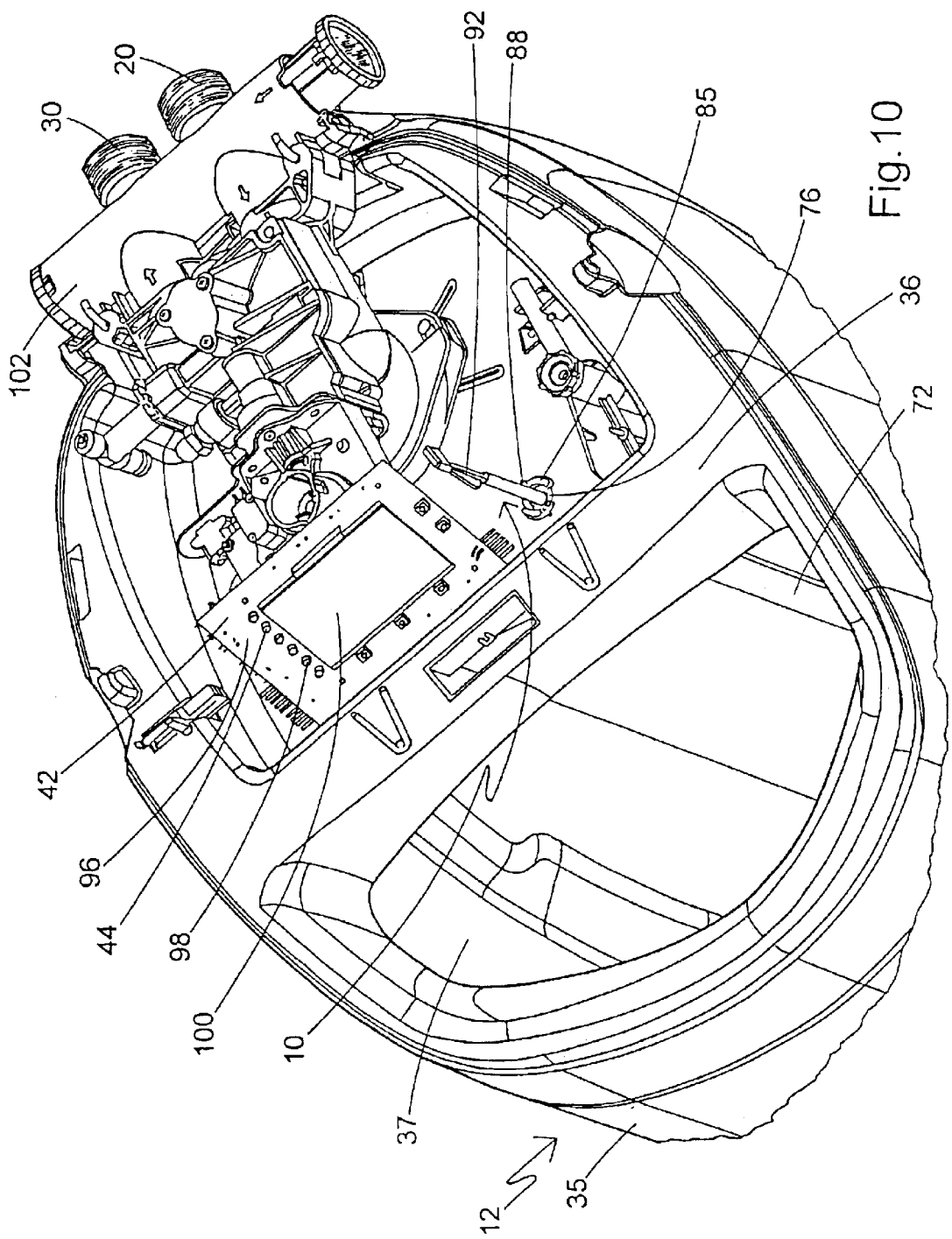
FIG. 10 is a perspective view of the top of a cabinet model softener with the cover removed.

Referring to FIG. 1, where it is necessary to have an uninterrupted soft water supply, multiple resin tanks 22 may be used so that one unit is softening while one or more others are regenerating. For home use, the entire water softener is often contained in a cabinet 35, shown in FIG. 2. Some water softener designs utilize the cabinet 35 as the salt chamber 16, allowing the softening agent 14 to be placed into the cabinet and occupy space around and between other elements of the softener 12. As shown in FIG. 10, models that utilize a single cabinet 35 often have a deck 36 that covers a large portion of the top of the cabinet. An opening 37 is provided in the deck for addition of the softening agent 14.

The resin tank 22 separates the ion exchange resin from the softening agent 14. Preferably, the resin tank 22 is a smaller tank that is housed inside the cabinet 35 of the water softener 12. However, the salt chamber 16 and the resin tank 22 may both be portions of the cabinet 35 that are separated from each other by dividers or partitions inside the cabinet, or, the salt chamber 16 and resin tank 22 may be entirely separate tanks. Any arrangement may be used for the salt chamber 16 and resin tank 22 that keeps the water being softened from contact with the softening agent 14.

The monitor 10 includes at least one signal emitter 38, an array of signal receivers or sensors 40, a controller 42 and an indicator 44 (FIG. 1). The signal emitter 38 produces a signal inside the salt chamber 16 in response to a request from the controller 42 at an appropriate time, as will be discussed below. Emission of the signal is sufficiently long in duration that each of the sensors 40 has an opportunity to respond to it, and the response transferred to the controller 42. For most signals, such as light or sound, duration in excess of one minute is rarely needed, and duration is often considerably shorter. The preferred signal is light, due to its reasonable cost, ease of use and reliability, making a light bulb or light source 46 the preferred signal-emitter 38, and shown in FIG. 2. Other types of signals, such as sound, are also suitable as long as some detectable characteristic of the signal is changed if it passes through the softening agent 14 to the sensor 40 compared to receipt of the signal when the level of softening agent has fallen below the sensor.

Positions of the one or more emitters 38 are limited to areas that allow every sensor 40 to receive a signal from at least one emitter. The emitters 38 are also placed above the highest brine 32 level to eliminate reflection and refraction of the signal as it passes through the brine and the air-liquid interface. Preferably, the emitter 38 is placed so that signals reaching the sensor 40 from the emitter are from a different direction than background signals that do not originate at the emitter 38. For example, when a light 46 is used, room light is a background signal source that can cause an output change in a photocell 40, even when the sensor 40 in the softening agent 14 does not receive the signal from the emitter 38. When the emitter signal and background signal come from differing directions, it is easier to use direction to shield the sensor 40 from background signals.

The emitted signal is detected by an array of signal-detecting sensors 40 designed to detect the type of signal being emitted and produce a measurable output in response to the signal. When the signal emitter 38 is a light, the preferred sensors 40 are photocells. In response to light, the photocell 40 decreases its resistively by than a factor of 10. This change in resistivity is measurable from the photocell 40, and is preferably used to detect whether or not the signal is being blocked from reception at the photocell 40 by the salt bed 14. When placed inside the salt chamber 16, the photocell 40 will normally register high resistance on the order of 1 MΩ when the light signal is not present, compared to a low resistance of about 10 kΩ to 100 kΩ when the light signal is being received. If the softening agent 14 is covering the photocell 40, the circuit containing the photocell responds with a high resistance. However, when the softening agent 14 is depleted to a level below the photocell 40, it is exposed to the light from the emitter 28 and the resistance of the photocell drops.

Figure 3:
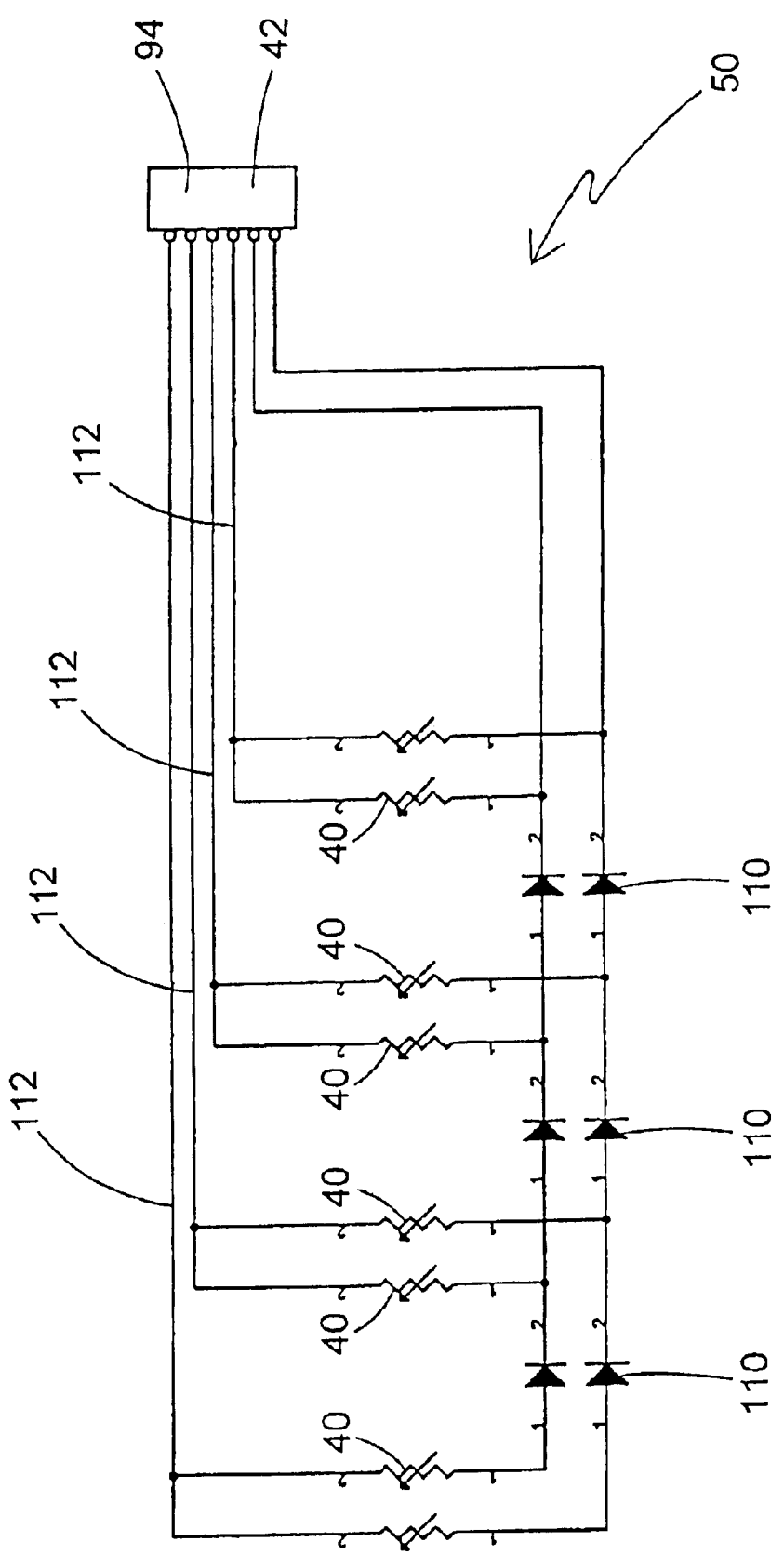
FIG. 3 is a circuit diagram of the circuit used to determine the resistance of the photocells.

FIG. 3 is a control circuit, generally 50, that shows how the photocells are wired in a 4×2 matrix. As the resistance of the photocell 40 changes, a control circuit, generally 50, produces changes in the voltage or current, either of which is measurable by the controller 42. The photocell 40 acts as a variable resistor. According to Ohms's Law:

$$V=I*R$$

at constant current (I), voltage (V) and resistance (R) are proportional. When the controller 42, seen in FIG. 2, measures voltage, it sends a small, but constant current through the photocell 40. If the resistance through the photocell 40 is high, the voltage returned to the controller 42 will also be high. If the resistance through the photocell 40 drops, the voltage will also decrease. Thus, the voltage provides the output from the photocell 40 that informs the controller 42 as to whether a particular sensor 40 is covered by the salt 14. Optionally, the controller 42 could detect change in resistance of the photocell 40 by measuring the current in the circuit at a constant voltage.

The difference in output from a sensor 40 that is covered with softening agent 14 and one that is above the agent is most easily determined when the change in output between these two conditions is maximized. Preferably, background signal is eliminated to maximize the difference in output from the sensor 40 that is attributable to the signal emitter 38. When photocells 40 are used, for example, the monitor optionally includes an interlock requiring the cover 54 (FIG. 9) to be in place on the water softener 12 during evaluation of the depth of the softening agent 14 to eliminate room light from producing a response from the photocell 40. This ensures that light perceived by the photocells 40 was produced by the emitter 38.

Turning now to FIG. 5, background signals are also reduceable by shielding the sensor 40 with a device, such a shroud 56, that blocks signals not originating from the direction of the emitter 38. The shroud 56 has at least one wall 58 that is made of a material opaque to the type of signal produced by the emitter 38. Preferably, positioning of the wall 58 should maximize blockage of background signals, while allowing signals from one or more emitter 38 to reach the sensor 40. More than one wall 58 is optionally used where background signals are likely to come from a plurality of sources, as long as the emitter 38 signals reach the sensor 40. As the length of the shroud wall 58 increases, the range of angles diminishes from which the signal will contact the sensor 40. Preferably, the shroud 58 includes a supporting structure, such as a clip 62 or other known fastener for attaching it to the sensor 40.

Now referring to FIG. 2, continuous monitoring of the softening agent 14 level is achieved by using an array of two or more sensors 40 that are displaced generally vertically in the salt chamber 16. A single sensor 40 can only indicate whether or not the softening agent 14 is present at the depth at which that sensor 40 is located. Multiple sensors 40 arranged generally vertically within the salt chamber 16 will each give an output as to the presence or absence of softening agent 14 at that depth. Location of sensors 40 vertically displaced from the minimum depth of the softening agent 14 to the maximum bed depth, provides for sensing of the bed depth at any sensor level.

As the softening agent 14 is depleted, successive sensors 40 decrease in resistance as they are exposed to the emitter 38. Addition of an optional reference sensor 64 above the maximum depth of the softening agent 14 is useful in distinguishing when the emitter 38 is malfunctioning compared to when the bed is full, and all sensors 40 are covered with softening agent. Preferably, four or more sensors 40 located within the bed of the softening agent 14 and the optional reference sensor 64 are used.

It is to be understood that the sensors 40 are not necessarily placed in a straight line, nor that the generally vertical displacement between sensors is constant. Preferably the sensors 40 are linearly spaced vertically throughout the bed depth, however, any useful spacing arrangement is suitable for use with this invention, including, but not limited to staggered placement. In some applications, it may be preferable to have the sensors 40 more closely spaced at the bottom of the bed of the salt or softening agent 14, providing additional accuracy near the bottom of the salt. It may also be advantageous, in some cases, to have the sensors 40 horizontally displaced as well as vertically displaced. Where the sensors 40 are horizontally displaced, multiple emitters 38 may be required to reach all sensors 40 with the signal. Horizontal displacement of some sensors 40 with respect to other sensors may allow the monitor 10 to continue to function properly even when sensors in one portion of the bed are inoperative because they are somehow blocked from receiving a signal from the emitter 38.

The specific number of sensors 40 is not important, however, increasing the number of sensors improves the accuracy of measurement of the softening agent 14 by decreasing the vertical distance between sensors. At least one critical sensor 66 is preferably located in a position at or slightly below a level where there is insufficient salt or softening agent 14 to completely restore the resin 28 on the next regeneration. When the output from the critical sensor 66 indicates that the level of softening agent 14 has dropped below this sensor, a low softening agent condition is present and a warning is communicated to the operator, preferably by the indicator 44.

Periodically, the salt chamber 16 is resupplied with 50–100 pounds or more of the softening agent 14. This process results in forces being exerted on walls 68 and a floor 70 of the chamber 16 due to the weight of the softening agent 14 as the pieces of softening agent bounce off the walls and fall to the floor. Preferably, the sensors 40 are enclosed in a protective device 72 (best seen in FIG. 8) that shields them from forces generated during resupplying of the softening agent 14 or pressure from the weight of the bed above the sensors. The protective device 72 may be any device that is shaped and configured to be transparent to the signal from the emitter 38, but will prevent damage or dislodging of the sensors 40 by falling pieces or the weight of softening agent 14.

As best seen in FIG. 8, most preferably, the protective device 72 is a tube that is transparent to the type of signal sent by the emitter 38. A single protective device 72 is preferably used to enclose all of the sensors 40, but use of a plurality of devices, each enclosing one or more sensors, is also considered to be part of this invention. When light is used, a clear plastic tube 72, having a diameter slightly larger than the largest dimension of the sensor 40, is preferred. Many types of protective devices 72 are possible, such as a wire mesh cage, a small box for each sensor mounted to the tank wall 68, salt chamber 16 and the like.

To provide consistent information as to the level of the softening agent 14, the sensors 40 are each to be held at a constant depth within the bed. Preferably the sensors 40 are mounted to a fixed object, such as the cabinet wall 68, the salt chamber 16 or the resin tank 22, as shown in FIG. 4. Another preferred arrangement is where the protective device 72 is held in place, and the sensors 40 are held at consistent positions within the device.

Figure 7:
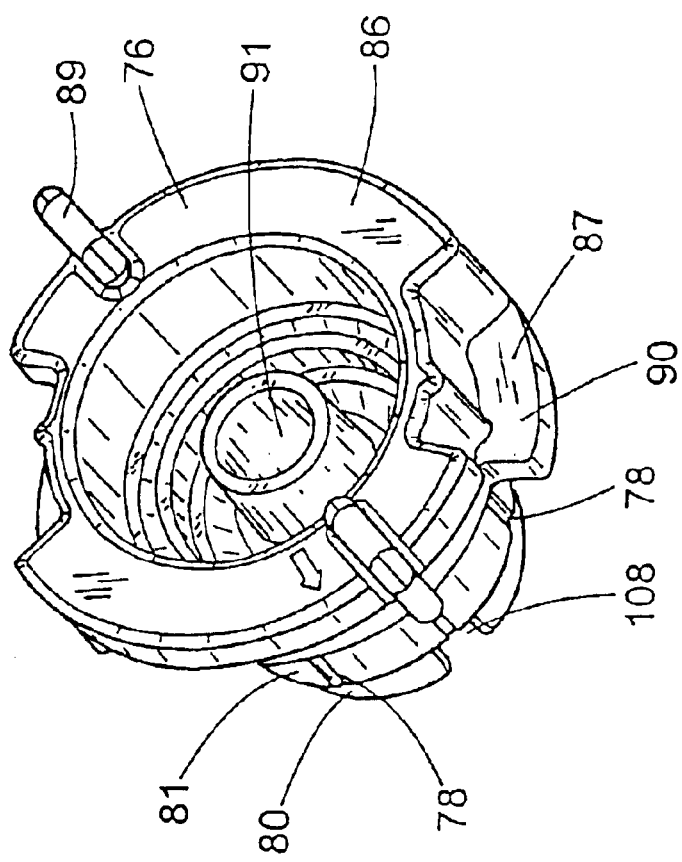
FIG. 7 is a perspective view of a top cap.
Figure 6:
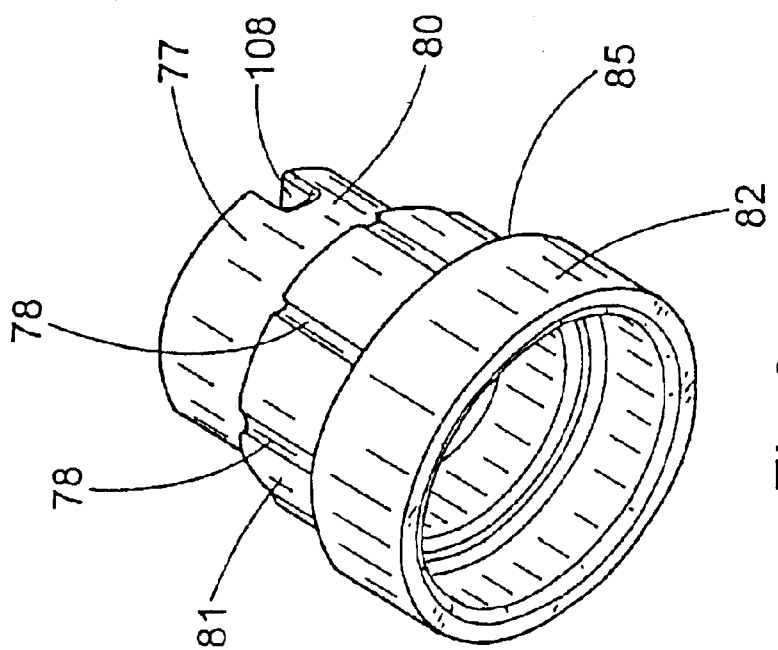
FIG. 6 is a perspective view of a bottom cap.

Referring to FIGS. 6, 7 and 8, a top cap 76 and a bottom cap 77 are suitable to seal the tube 72, while allowing access to the tube contents for maintenance purposes, if desired. Both caps 76, 77 are preferably friction fit onto the plastic tube 72 with the assistance of optional radially projecting ribs 78 to hold them in place in the tube. Adhesives are also suitable for fixing the caps 76, 77 to the plastic tube 72, as are any other ways known in the art of affixing a cap to a tube, such as using O-rings 79. The preferred top cap 76 and bottom cap 77 are described below, however, many such caps can be designed to perform the same functions.

Both preferred caps 76, 77, best seen in FIGS. 6 and 7, include three concentric, cylindrical cross-section portions 80, 81 and 82. A first cylindrical portion 80 is the most narrow, and fits farthest into the plastic tube 72. Next, a second cylindrical portion 81 is sized to fit tightly into one end of the plastic tube 72. The ribs 78 preferably are located on the second cylindrical portion 81 and radially project outward to assure a good friction fit between plastic tube 72 and the bottom cap 77. A third cylindrical portion 82, generally the widest portion, remains on the outside of the plastic tube 72. When an O-ring 79 is used to seal the tube 72, it is suitably placed around the first cylindrical portion 80 and rests against a ledge 85 that connects the first portion with the second portion 81. Although a cylindrical shape is preferred, the shape of the third portion 82 is variable depending on the method of attaching the plastic tube 72 to the water softener 12. Preferably, the bottom cap 77 rests on the floor 70 of the softener 12 in an optional tray 83. The bottom cap 77 will most commonly rest in a depression 84 to prevent it from sliding from one side to another.

As best seen in FIG. 7, the preferred top cap 76 is also generally cylindrically shaped. A flange portion 86 rests over the top of the plastic tube 72. When the softener 12 is mounted in a cabinet 35, the top cap 76 preferably attaches through the deck 36, and secures to the deck with a twist lock 87. A salt sensor access hole 88 in the deck 36 is sized and configured to receive the top cap 76 so that the flange 86 rests on the top surface of the deck. The top cap 76 also has finger grips 89 and a lower lip 90 that is spaced downwardly toward the floor 70 of the cabinet 35 at least the thickness of the deck 36 from the flange 86. When the top cap 76 is twisted by exerting a rotational force on the finger grips 89, the deck 36 is wedged between the flange 85 and the lower lip 90, holding the cap in place.

The top cap 76 also features one or more openings 91 through which wires pass between the sensors 40 and the controller 42. Communication between these elements is most easily accomplished through the use of conventional wiring 92 (best seen in FIG. 2), however, information or instructions are optionally transferred by other means, such as an infra red beam, fiber optics and other techniques as will be apparent to those skilled in the art.

Referring again to FIGS. 2 and 3, the controller 42 initiates the production of a signal from the emitter 38, receives and interprets the output from the sensors 40, and activates one or more of the indicators 44. Most modern water softening systems include a microprocessor 94 in the electronic unit controller 18. Some duties of the unit controller 18 include timing of the softening and regeneration cycles, and the opening and closing of valves as appropriate. It should be appreciated that the microprocessor 94 functions, except those specifically described in this application, are not a part of this invention and are not to be confused with the controller 42 functions, even when carried out by the same or similar equipment. Nor is it anticipated that the controller 42 be a physically separate unit from the unit controller 18 if the functions described here are present and available to monitor the sensors 40 and indicate when a low-salt condition is present. Although the monitor 10 of the present invention, as described, is most advantageously designed to be used with such modern water treatment systems, the monitor and process of this invention may also be used with less complex systems or retrofit into older water softener units 12.

To initiate the signal from the emitter 38 when there is no liquid in the salt chamber 16, the controller 42 is designed to generate the signal once an appropriate time is reached during the regeneration cycle. A modem unit controller 18 is programmed to initiate signal from the emitter 38 at any desired time. In less sophisticated softening units 12, information as to the timing of the regeneration cycle can be determined from, for example, the position of a cam wheel (not shown) that opens and closes valves during regeneration. Whatever control mechanism is used to control regeneration is tapped to provide the controller 42 with timing information.

After initiating a signal from the emitter 38, the duration and cessation of the signal is preferably determined by the controller 42. However, in simple units, a separate timer or other means is suitable to produce signal for a predetermined time period, then turn it off.

Figure 9:
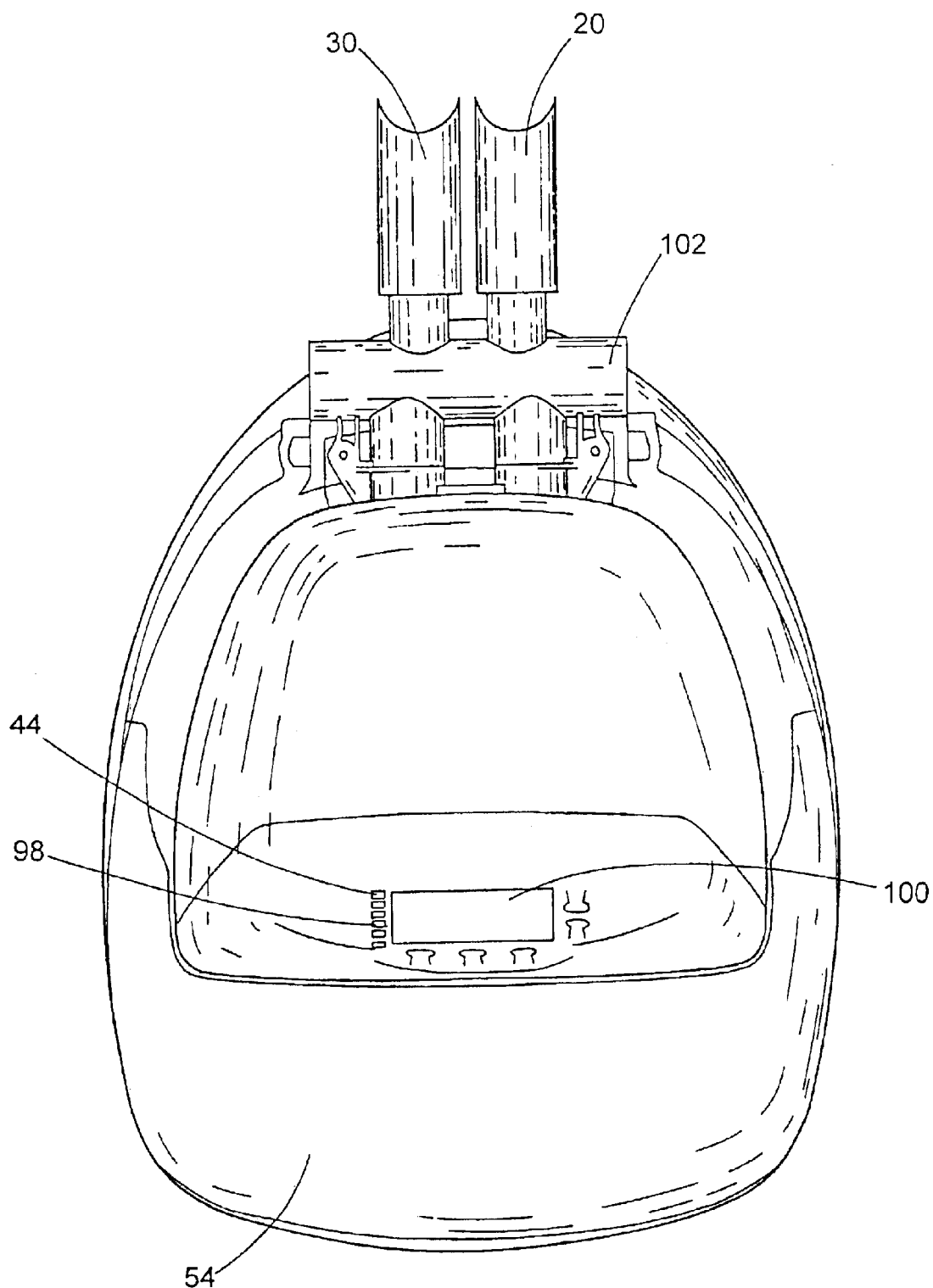
FIG. 9 is a top plan view of the cover of a cabinet model with an indicator array and display.

The preferred controller 42 includes a circuit board 96 that performs mathematical calculations as well as detects output from the sensors 40, allowing more sophisticated output analysis. The circuit board 96 is designed and built using any technique that is known to those skilled in such arts. Circuitry for this controller 42 includes simple arithmetic functions, comparison of values and activation of one or more indicators 44 (FIGS. 1 and 9).

Preferably, the controller 42 also includes optional functions that take advantage of modern electronics. For example, the board 96 optionally includes stored data as to approximately how much softening agent 14 is used per regeneration. The board then calculates the expected bed level based on the previous bed level and compares them. Extreme discrepancies between the calculated bed level and the measured bed level signal a problem in bed level measurement, such as for formation of salt bridges, a malfunctioning or inoperative sensor 40, loss of eduction or overfilling of the salt chamber 16. Salt bridges are also discoverable if the sensor 40 outputs indicate that it is clear of the softening agent bed, but the sensor above it is still covered by softening agent 14.

When the controller 42 determines that the softener 12 requires attention, it activates one or more indicators 44 for warning the operator. This occurs periodically when a low softening agent 14 condition is present as determined by the critical sensor 66 or when the controller 42 calculates that the softening agent 14 is depleted. If the optional reference sensor 64 is present and is not activated by the signal from the emitter 38, the controller should also warn of that condition. Referring to FIG. 9, any indicator 44 is suitable that informs the operator of a condition requiring attention, such as a displayed message, an indicator light 44 or series of lights 98, a warning sound and the like. Preferably, if the indicator 44 is used for a plurality of warning conditions, some provision is made to distinguish between them.

When a circuit board 96 is used, the indicator 44 optionally takes the form of a display device 100 such as an LCD to deliver additional information compared to a simple on/off indicator 44. The display 100 could show the bed level by calculating the bed level as determined by the sensor 40 output. For example, if the sensors 40 change from a signal-detecting condition to a no-signal-detecting condition between 50% and 60% of the bed depth, this information could be communicated to the operator by the display 100, providing a real-time indicator of the level of softening agent 14. If no output at all is detected from a sensor 40, the display 100 could show a message requesting that the particular sensor be checked for malfunction. The display 100 is also useful for a number of other messages and indications that will be obvious to those skilled in the art. Preferably, the display 100 is located on the outside of the cabinet 35, so that it is visible to the operator without having to open the tank cover 54. A suitable location for the display 100 is on or near the control valve 102 on the top of the softener 12.

The display 100 takes the form of any type of display device known in the art. A preferred display 100 is a series of light emitting diodes (LED) as the lights 98 could be used to indicate the salt level. Such an array of LED's 98 optionally has a scale or reference marks so that the diode or diodes that are activated can be easily related to the amount of salt in the salt chamber 16. The number of LEDs 98 is not important, as the controller 42 is capable of performing the arithmetic calculation to translate the information when the number of LEDs does not match the number of sensors 40. Another suitable display 100 includes a digital display, capable of showing multiple error codes or messages to distinguish between a plurality of conditions for which intervention by the user is desirable.

Now referring to FIGS. 1, 5, and 8, the controller 42 receives the output from the sensors 40 by any means known in the art. Preferably, information is transferred by an elongated bar-like member 104 that fits inside the plastic tube 72, into which the sensors 40 are plugged. This arrangement has many advantages. The wiring 92 and sensors 40 are protected from the water and salt in the salt chamber 16. The elongated member 104 is preferably a sensor circuit board that allows sensors to plug directly into the circuit controller board 96, particularly where the sensors 40 are mounted within the plastic tube 72. Many other ways are available to communicate the output to the controller 42, including but not limited to running wires down the tube 72, beaming an infrared signal along the length of the tube, and other techniques as will be apparent to those skilled in the art.

Friction-fitting of the elongated member 104 into an optional slot or guides 108 in the bottom cap 77 aligns the elongated member 104 so that the sensors 40 are in a consistent position to receive the signal from the emitter 38. The slot 108 also holds the elongated member 104, and thus the sensors 40, at a consistent depth in the bed.

There is space on the elongated member 104 between the sensors 40 to hold optional electronic components, such as diodes 110 (shown in FIG. 3), that may be part of the controller 42 circuit. As shown, diodes 110 between each of the sensors 40 allows current flow in only one direction. By measuring the current of voltage between electrical leads 112 at each sensor 40, current flow in a single direction enables the controller 42 to determine the output of each individual sensor, and therefore determining the two sensors that are immediately above and below the top of the salt bed.

Preferably, a sensor assembly 114 comprising the plastic tube 72, the elongated member 104 upon which the sensors 40, diodes 110 and other components are mounted, the top cap 76 and the bottom cap 77 are manufactured as a sealed unit. Sealing of the caps 76, 77 to the tube 72 assures the integrity of the assembly 114 and minimizes the possibility that the highly corrosive brine solution will leak into the protective tube. Most preferably, the O-rings 79 seal each of the caps 76, 79 to the tube. Adhesives may be used in addition to the O-rings 79 or other sealing device. Sealing protects the sensors 40 from damage due to the presence of the corrosive brine 32, or covering of the sensor with salt deposits. If the assembly becomes inoperable, the entire assembly 114 is preferably removed from the cabinet 35 and replaced.

Use of the plastic tube 72 as the protective device may optionally provide maintenance access to the sensors 40 even when those sensors are located below the level of the softening agent. If, for example, a sensor 40 malfunctions, is disconnected, needs to be reset or otherwise becomes inoperative, it can be withdrawn from the chamber 16 through the protective tube 72, instead of being required to empty the entire bed of softening agent 14 to access the bad sensor. However, when the caps 76, 79 are removed, there is potential for the seals, such as O-rings 79, to be damaged, incorrectly installed, or not installed at all. If this occurs leakage of brine into the tube 72 could damage any of the electrical components.

Again referring to FIG. 2, timing of when the monitor 10 takes readings of the bed level is also important. Certain signals, such as light or sound, are reflected or altered as they pass through water. Throughout the softening cycle, during a portion of the time water is present in the salt chamber 16, permitting a saturated solution 32 to form as the softening agent 14 is exposed to water. After the brine solution 32 has been pumped into the resin tank 22 for regeneration, water is absent from the salt chamber 16 until the last step when the tank is refilled with water. Optimally, determination of the bed level takes place during resin regeneration, when there is no water in the salt chamber 16 to interfere with the signal. The controller 42 is preferably programmable to check the bed level only at the appropriate time in the regeneration cycle and if the cover 54 is in place, and to display an appropriate message if both of these criteria are not met.

During use, the controller initiates the bed level check at a time when there is no liquid in the salt chamber 16 by requesting the emitter 38 to produce a signal. The emitter 38 then generates the signal for a sufficient period of time for the signal to be received by each of the sensors 40.

While the signal is being emitted, the exposed sensors 40 receive it. All sensors 40 should receive the signal unchanged unless they are covered by the bed of softening agent 14. If those of the sensors 40 that are below the surface of the bed receive the signal, the signal is changed in some way, as by a change in frequency or intensity. Where photocells 40 are used, the intensity of the light is so reduced that the photocells remain in a state of high resistance. If a reference sensor 64 is present and fails to receive the signal, the controller preferably activates an error light or sound to warn the operator that some portion of the monitor 10 is not functioning properly.

Output from the sensors 40 are evaluated by the controller 42 to ascertain whether or not they are receiving the signal, and whether that signal is modified by the presence of the bed of softening agent 14. In the case of photocells 40, the controller 42 measures either the voltage or amperage of the circuit to determine the resistance of the photocell. In evaluating the sensor 40 outputs, the controller 42 determines which of the sensors 40 is above the surface of the bed of the softening agent 14 and which sensors are below the surface. If the critical sensor 66 indicates that it is exposed to the signal, or by calculation the controller 42 determines that there is insufficient softening agent 14 to complete the next regeneration, the controller activates an indicator 44 that warns the operator of a low softening agent 14 condition. Where the softener 12 continuously displays the bed depth, the controller 42 sends an appropriate message to the indicator 44.

Although the salt level monitor 10 of the present invention has been shown and described as an array of sensors 40 that respond to a single emitter 38, those skilled in the art will also recognize that a similar result is obtainable using a single sensor 40 and an array of emitters 38. An array of lights, for example, could be lit in sequence along the length of the array and the output of the photocell 40 evaluated between energizing of one light and activation of the next light in the sequence. Although the preferred monitor 10 is described as part of a modern electronically controlled softener 12, a basic version of the monitor is adaptable for retrofit into older model softeners. While a particular embodiment of the present invention has been shown and described, it will be appreciated by those skilled in the art that changes and modifications may be made thereto without departing from the invention in its broader aspects and as set forth in the following claims.

What is claimed is:

1. An automatic monitor for use in a chamber with a solid, water-soluble softening agent, comprising:
   a signal emitter that produces a signal in response to a request;
   an array of signal-detecting sensors displaced in the chamber from the minimum depth of the softening agent to the maximum depth of the softening agent, each of said sensors producing an output in response to said signal that varies depending on whether or not said signal is blocked by the solid softening agent;
   a controller configured for issuing said request, receiving and interpreting said output and determining a low softening agent condition based on said output when the softening agent is depleted to a predetermined amount; and
   an indicator configured for warning when said low softening agent condition is present.

2. The monitor of claim 1, wherein said softening agent is salt.

3. The monitor of claim 1, wherein said sensors are linearly spaced vertically in the tank.

4. The monitor of claim 1, wherein said sensors are photocells and said emitter is a light.

5. The monitor of claim 4, wherein said photocells are secured to an elongate circuit board which is electronically connected to said controller.

6. The monitor of claim 1, wherein said indicator includes a display for communicating a real-time indication of the softening agent level.

7. The monitor of claim 1, wherein said controller is configured to determine a no-output condition.

8. The monitor of claim 1, wherein said controller sends a signal only when no brine is present in said tank.

9. An automatic monitor for use in a tank with a water soluble softening agent, comprising:
   a signal emitter that produces a signal in response to a request;
   an array of signal-detecting sensors displaced in the tank from the minimum depth of the softening agent to the maximum depth of the softening agent, each of said sensors producing an output in response to said signal that varies depending on whether or not said sensor is covered by the solid softening agent;
   a protective device that houses said sensors;
   a controller configured for issuing said request, receiving and interpreting said output and determining a low softening agent condition based on said output when the level of the softening agent is depleted to a predetermined level; and
   an indicator configured for warning when said low softening agent condition is present.

10. The monitor of claim 9, wherein said protective device is a transparent tube.

11. The monitor of claim 9, further including at least a top cap and a bottom cap for enclosing said tube and securing same in operational position in the tank.

12. The monitor of claim 11, wherein said top cap further comprises:
    a lock that engages a mounting surface when said top cap is positioned in an opening in said mounting surface and rotated.

13. A water softener comprising:
    a main tank housing an ion exchange resin;
    a salt chamber housing a solid, water-soluble softening agent that forms a brine solution when said softening agent is dissolved in water, said resin being regenerated by said brine at periodic intervals;
    a signal emitter that produces a signal in response to a request;
    an array of signal-detecting sensors configured for receiving said signal, said sensors being displaced generally vertically in the chamber from the minimum depth of said softening agent to the maximum depth of the softening agent and producing an output in response to said signal that varies depending on whether or not said signal is blocked by said solid softening agent;

a controller for issuing said request, receiving and interpreting said output and determining a low softening agent condition based on said output when said softening agent is depleted to a predetermined amount; and an indicator warning when said low softening agent condition is present.

14. The water softener of claim 13, wherein said emitter produces a signal only when said brine solution is absent from said brine tank.

15. The water softener of claim 13, wherein said emitter is a light.

16. The water softener of claim 13, further comprising a plastic tube.

17. The water softener of claim 16, wherein said array of signal-detecting sensors is sealed within said plastic tube and said plastic tube is removably mounted to said salt chamber.

18. A process for monitoring the level of a softening agent in a water softener, comprising:

a controller requesting an emitter to send a signal;

said emitter sending the signal to an array of sensors displaced in a bed of softening agent solids from the minimum depth of the softening agent to the maximum depth of the softening agent;

each of said sensors varying an output in response to said signal, the signal is blocked by the softening agent solids;

said controller receiving and interpreting said outputs and determining if a low softening agent condition is present; and said controller indicating when the low softening agent condition is present.

19. The process of claim 18, wherein said indicating step comprises activating at least one light emitting diode.

20. The process of claim 18, wherein said controller interprets changes in circuit voltage due to varying resistance from a photocell.

21. The process of claim 18, wherein said requesting step comprises supplying power to said emitter.

22. The process of claim 18, wherein said emitting step comprises illuminating a light.

23. The process of claim 22, further comprising pumping a solution of a water-soluble softening agent from a brine tank to a resin tank; and refilling the brine tank with water, wherein said sending step occurs after said pumping step and before said refilling step.

* * * * *

UNITED STATES PATENT AND TRADEMARK OFFICE
CERTIFICATE OF CORRECTION

PATENT NO. : 6,696,966 B2
APPLICATION NO. : 09/835981
DATED : February 24, 2004
INVENTOR(S) : Bearak, Justin Blair It is certified that error appears in the above-identified patent and that said Letters Patent is hereby corrected as shown below:

Column 14,
Line 2, delete "softening agent;" and insert -- softening agent, --.
Line 4, delete "signal, the signal" and insert -- signal that varies if the signal --.

Signed and Sealed this

Twentieth Day of June, 2006

JON W. DUDAS
*Director of the United States Patent and Trademark Office*